United States Patent [19]

Wright

[11] 4,432,415
[45] Feb. 21, 1984

[54] PLATE HEAT EXCHANGER

[75] Inventor: Felix W. Wright, Copthorne Bank, Nr. Crawley, England

[73] Assignee: The A.P.V. Company Limited, Crawley, England

[21] Appl. No.: 341,749

[22] Filed: Jan. 22, 1982

[30] Foreign Application Priority Data

Jan. 30, 1981 [GB] United Kingdom ................. 8102899

[51] Int. Cl.³ ................................................ F28F 3/10
[52] U.S. Cl. ..................................... 165/166; 165/167
[58] Field of Search .................................. 165/167, 166

[56] References Cited

U.S. PATENT DOCUMENTS 2,191,044 2/1940 Seligman ............................. 165/167
2,814,469 11/1957 Hytte .................................. 165/167
4,377,204 3/1983 Johansson ........................... 165/166

FOREIGN PATENT DOCUMENTS 428634 5/1935 United Kingdom ................ 165/167
2028996 3/1980 United Kingdom ................ 165/167
2075656 11/1981 United Kingdom ................ 165/166

Primary Examiner—Sheldon J. Richter
Attorney, Agent, or Firm—Christel, Bean & Linihan

[57] ABSTRACT

In the gasketing of plate heat exchangers, it has long been conventional for a compressible elastomer gasket to be secured in a gasket recess by means of an adhesive. In accordance with the invention, it is proposed that a gasket should be in two parts, namely a relatively hard outer part which is secured by adhesive or otherwise to a plate, and a soft sealing part which is received in a gasket recess defined in part by the outer part and is mechanically retained by the outer part so that it can be comparatively easily installed and removed.

13 Claims, 14 Drawing Figures

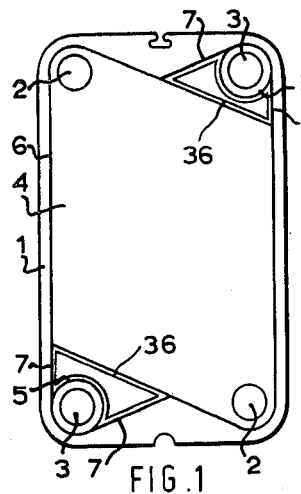
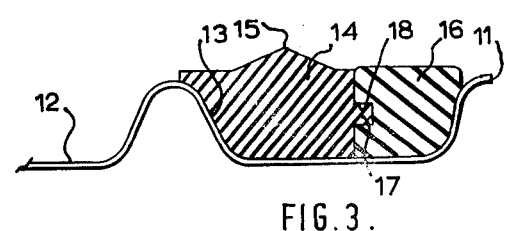
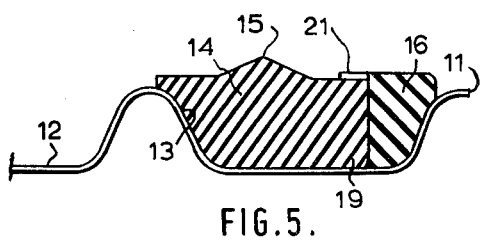
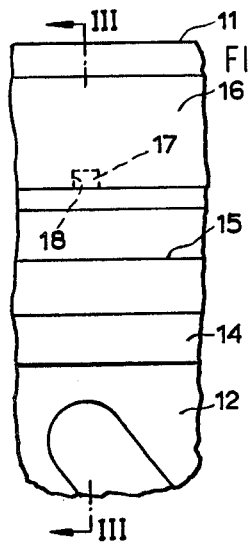
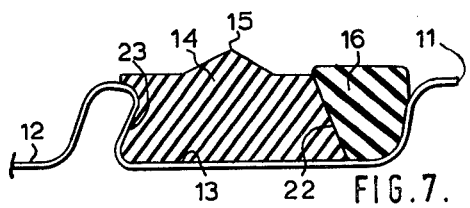
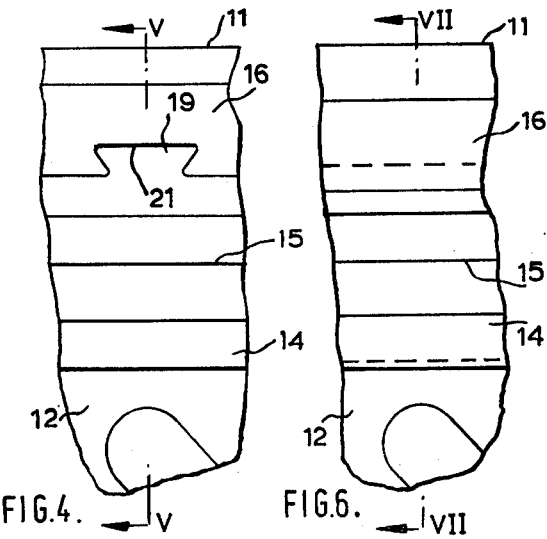

FIG.12.
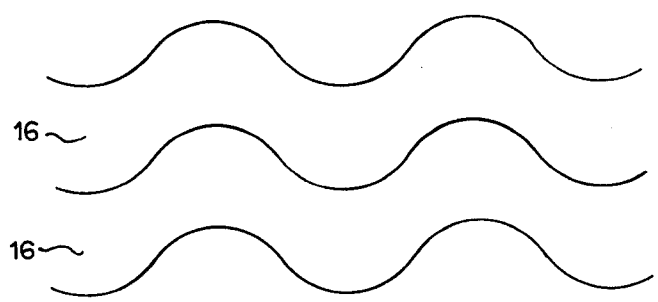
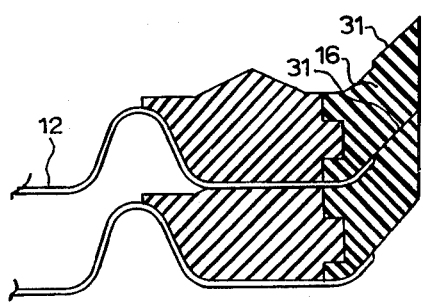
FIG.13.
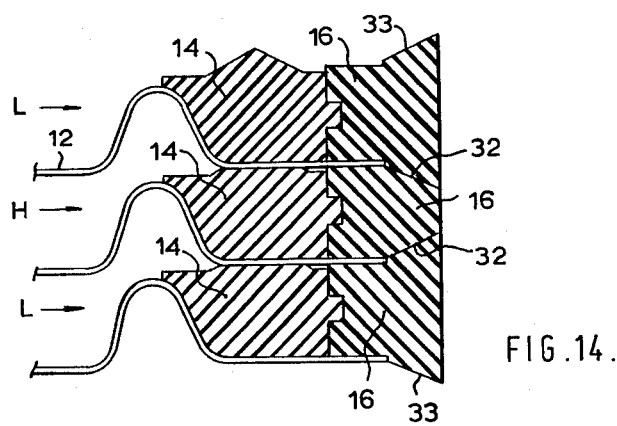
FIG.14.

PLATE HEAT EXCHANGER

This invention relates to heat exchanger plates incorporating a normal gasket arrangement, and to plate heat exchangers incorporating such plates.

A plate heat exchanger comprises a pack of plates arranged in spaced, face-to-face relationship to define flow spaces between adjacent plates, with the media in adjacent flow spaces being in heat exchange relationship by conduction through the plate. The peripheral boundaries of the flow spaces are defined by gaskets normally set in recesses or grooves in the plate, and the pack of plates is normally under compression to ensure good sealing between the gaskets and the adjacent plates.

Apart from the problem of the seal being broken by leakage past the gasket, problems are also encountered arising as a result of the internal pressure in the flow spaces tending to move the gaskets laterally outwardly. In order to overcome this problem, and also to provide the marginal area of the plate with some inherent strength, various complex shapes of the marginal area of the plate have been devised. These lead to complex pressing and moulding requirements, with their attendant design difficulties and constraints.

Also, it is conventional for a gasket to be secured in a gasket recess by means of a system of adhesive and when, as periodically becomes necessary, the gasket has to be replaced, it is necessary to strip out the old gasket, clean up the recess and then install a fresh gasket with adhesive. The adhesive then has to be allowed to be cured before the plate can be put back into service. There is therefore considerable interest in providing a mechanical retention for a sealing gasket which simplifies the procedure of fitting and replacing gaskets.

According to a first aspect of the invention, there is provided a plate for a plate heat exchanger, the said plate comprising a two part gasket, a first part of the gasket being of comparatively hard elastomeric material and substantially permanently attached to the plate, and a second part of the gasket being of comparatively soft elastomeric material so as to be compressible to form a seal, the said second part being located on a side of the said first part nearer the flow space to be sealed whereby the first part provides external lateral reinforcement of the second part against the pressure in the flow space to be sealed, and the second part being secured to the plate by means of the first part and not being directly attached to the plate.

By using a comparatively hard elastomer attached to the plate, by adhesive or otherwise, to provide lateral support to the sealing part of the gasket, the actual plate pressing can be simplified. By attaching the sealing or soft part of the gasket mechanically to the hard part, rather by adhesive to the plate, the fitting and replacement of the soft part of the gasket thus becomes much simpler than hitherto. Also, the soft part of the gasket shields the harder part from the process fluid, so that the harder part is not likely to deteriorate in service to nearly the same extent as the sealing part and therefore has a much longer life before replacement becomes necessary. Accordingly, the use of adhesive to secure it to the plate it not subject to the same disadvantages as its use for a conventional gasket.

The hard part of the gasket arrangement is preferably of such hardness that it is substantially incompressible under the compression forces applied between the plates so that it may be used to define accurately the spacing between adjacent plates.

The outer wall of the conventional gasket recess may be wholly or partly omitted to simplify the pressing still further, and the hard part of the gasket may extend beyond the edge of the plate to cooperate with the hard parts of the gaskets on the adjacent plates.

The invention further includes plate heat exchangers incorporating plates in accordance with the invention as set forth above.

The invention will be further described with reference to the accompanying drawings, in which:

FIG. 1 is a diagrammatic elevation of a typical heat exchanger plate showing the position of the gasket;

FIG. 2 is an elevation of a detail of the plate edge showing a first form of gasket arrangement in accordance with the present invention;

FIG. 3 is a section on the line III—III of FIG. 2;

FIG. 4 is a view similar to FIG. 2 showing an alternative form of gasket;

FIG. 5 is a section on the line V—V of FIG. 4;

FIG. 6 is a view similar to FIG. 2 showing a further alternative form of gasket;

FIG. 7 is a section on the line VII—VII of FIG. 6;

FIG. 12 is a view similar to FIG. 11 showing a modified form thereof;

FIG. 13 is a section similar to FIG. 11 showing a still further variation; and

FIG. 14 is a section through the edge of the adjacent plates showing another variation.

Figures 8, 9:
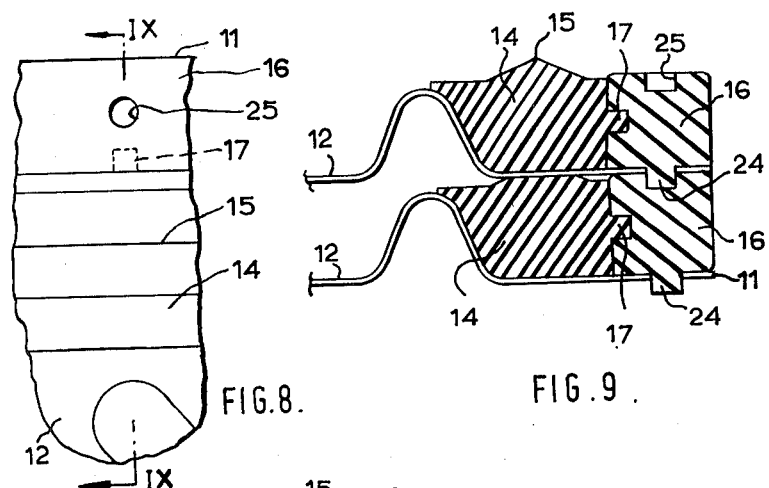
FIG. 8 is a view similar to FIG. 2 showing a still further modified form of gasket.
FIG. 9 is a section on the line IX—IX of FIG. 8 showing parts of two adjacent plates.

FIG. 1 is an elevation of a typical form of heat exchanger plate 1 which is provided with four corner ports 2 and 3, the corner ports 2 being in communication with the flow space zone 4 defined by a gasket on the plate 1 and by the plate 1 and an adjacent plate, and the other two corner ports 3 being isolated from the flow space zone 4. The ports 3 are surrounded by port gaskets 5, and the flow space zone 4 is surrounded by a peripheral gasket 6. In addition, further lengths 7 of gasket connect the port gaskets 5 to the peripheral gasket 6. FIG. 1 is purely diagrammatic and is designed merely to show the positions and not the construction of the gasket.

It will be appreciated that a conventional gasket is normally mounted in a gasket groove or recess pressed into the plate and is held there by adhesive.

Turning now to FIGS. 2 and 3, an edge of a plate is indicated by the reference numeral 11 and a part of the flow space zone by the numeral 12. A gasket recess is shown by the reference numeral 13, being defined by inner and outer pressed folds in the metal of the plate. Within the gasket recess 13 there is shown a two part gasket consisting of a comparatively soft elastomeric part 14 having a sealing peak 15 and a comparatively hard elastomeric part 16 which is substantially incompressible in use. The hard part 16 is secured, in this embodiment, to the plate by adhesive and the soft part 14 is attached to the hard part by a series of protuberances 17 which fit with some friction into corresponding recesses 18 in the hard part 16.

It will be seen that with the hard part 16 located outside the soft part, it provides considerable lateral reinforcement, and the mechanical engagement between the two parts of the gasket means that the soft part is sufficiently well retained in the gasket in situ, but its insertion and removal, when required, is a comparatively simple operation, bearing in mind the flexible and resilient nature of the soft part 14.

Also, the substantially incompressible hard part acts efficiently as a spacer to define the depth of the flow space when the pack is compressed.

FIGS. 4 and 5 show an alternative arrangement, in which the soft part 14 is fitted with a series of dovetail projections 19 which fit, with some interference, into corresponding recesses 21 in the hard part 16. It will be seen from FIG. 5 that the dovetail projections 19 extend for the full height of the soft part 14.

In the variations shown in FIGS. 6 and 7, the hard part 16 is provided with an inner surface 22 which is inwardly inclined away from the base of the gasket groove 13. The inner wall 23 of the gasket groove 13 is also inclined inwardly of the recess so that the walls 22 and 23 between them define an undercut or dovetail gasket recess for the soft part 14 which is thus mechanically retained but may be comparatively easily removed and replaced as required.

As an alternative, or addition, to retaining the hard part on the plate by means of adhesive, it may be provided with protuberances 24 which pass through preformed apertures in the plate and enter blind holes 25 in the gasket on the subjacent plate. It will be noted that in this variation, as illustrated, the outer wall of the gasket recess is not pressed into the plate, but is constituted solely by the hard part 16. It is also to be noted that retention of the soft part 14 is shown as being by means of the protuberances 17, but it will be appreciated that this form of retention of the hard part 16 of the gasket may be utilised in conjunction with any suitable means of attachment of the soft part 14 to the hard part 16.

It is also to be noted that the hard part 16, being substantially incompressible, has to be of a height less than the compressible soft part which is intended to be compressed so that the sealing peak 15 is flattened when the plate pack is assembled and tightened. The lower of the two soft parts 14 as shown in FIGS. 8 and 9 illustrates the flattened configuration adopted by the peak 15 when in use.

Figure 10:
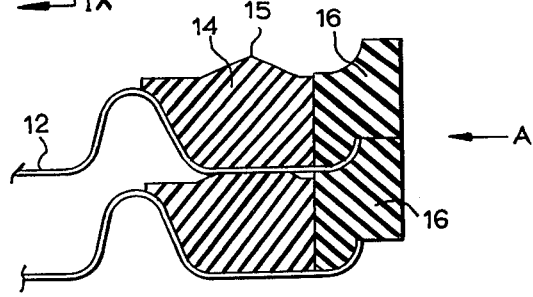
FIG. 10 is a sectional view, similar to FIG. 9 showing another modified form of gasket.
Figure 11:
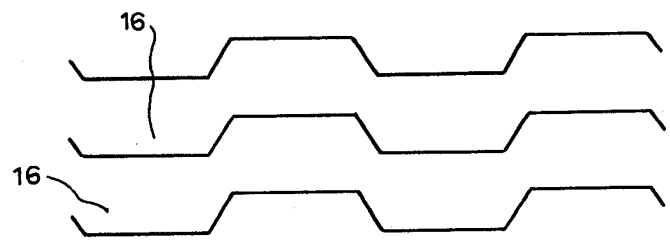
FIG. 11 is a partial elevation on the arrow A of FIG. 10.

It will be appreciated that the hard part 16 is substantially permanently secured to the plate by means of adhesive as its replacement will not become necessary as often as replacement of the sealing or soft part of the gasket. Accordingly, the hard part of the gasket may assume other structural functions apart from retention of the sealing part of the gasket. FIG. 10 shows a form of gasket arrangement in which the outer wall of the gasket recess is of very limited height and the hard part of the gasket 16 extends beyond the edge of the plate so as to cooperate with the hard part 16 on the adjacent plates, one of which is illustrated. Where the hard part 16 extends beyond the edge of the plate, its form is no longer constrained by the presence of the plate and it may be provided with corrugations or undulations along the length of the gasket as illustrated in FIGS. 11 and 12 which are alternative views taken on the arrow A of FIG. 10.

It will be appreciated that in a plate heat exchanger, the internal product pressure can vary considerably from one space to the next on either side. Accordingly, unbalanced forces can arise on adjacent gaskets and it is necessary to provide resistance to limit local deflections which may reduce the ability of the gasket to withstand internal pressures. This interlocking of the externally extending zones of the hard part 16 has considerable benefit in this connection.

It will also be appreciated that the actual mode of connection of the soft part 14 to the hard part 16 has been omitted from FIG. 10, but it is envisaged that any of the three modes of such connection hitherto described may be used, as may any other suitable variation of them.

FIG. 13 shows a further variation in which the part part 16 is upwardly inclined, as indicated at 31 so as to provide a wedge or ramp effect to centre adjacent plates on each other, thus enhancing the stability of the plate pack. In this variation, the extensions may also undulate in the manner illustrated in FIGS. 11 or 12.

As previously discussed, the process fluid may be under comparatively high or low pressure when compared with the pressure of the service fluid in the adjacent flow space zones. This gives rise to uneven pressures not only on the plates but also acting outwardly on the gaskets as indicated by the letters H and L used in FIG. 14 to illustrate the High and Low laterally acting pressures in the fluid flow spaces. In order to provide for enhanced resistance against the higher pressure, it is envisaged that the hard part 16 of a gasket sealing a high pressure flow space should be formed with wedge shaped edges 32 which converge in an outward direction and cooperate with corresponding divergent edges 33 on the hard parts 16 of the adjacent gasket. In this way, the high pressure seals are reinforced additionally by the hard parts of the lower pressure seals. In addition to providing for additional reinforcement for the gasket subjected to high pressure, there are occasions, e.g. where hazardous fluids are being handled, where additional security may be required even though the working pressure is not particularly high, and this construction may also be used in heat exchangers for these purposes.

It will be appreciated that in addition to being provided at the edges of the plates, two part gasket arrangements may also be provided in the region of the ports 2 and 3. For instance in the so-called bridge zones between the ports 3 and the flow space 4 there may be provided a closed contour spacer, of which the position is illustrated at 36 in FIG. 1. This spacer would constitute the hard part of the gasketing in that area and would for instance take the general sectional form of the hard part 16 of any of FIGS. 2 to 7. It will be appreciated that there is no flow through these bridge zones and that they are normally vented, but the presence of a spacer has an important function in supporting the adjacent spaces when there is flow.

Various modifications may be made within the scope of the invention.

I claim:

1. A plate for a plate heat exchanger, the said plate comprising a flow space zone and a two part gasket to seal a flow space zone, a first part of the gasket being of comparatively hard elastomeric material and substantially permanently attached to the plate, and a second part of the gasket being of comparatively soft elastomeric material so as to be compressible to form a seal, the said second part being located on a side of the said first part nearer the flow space zone to be sealed, said first and second parts having co-operating structures in operative contact such that said second part is mechanically retained by said first part, whereby the first part provides external lateral reinforcement of the second part against the pressure in the flow space zone, the second part is secured to the plate by means of the first part and is not directly attached to the plate, and said second part is mechanically retained by said first part in a manner allowing convenient removal of said second part for replacement.

2. A plate as claimed in claim 1, in which the first part of the gasket is secured to the plate by adhesive.

3. A plate as claimed in claim 1, in which the first part of the gasket has a series of protuberances engaging apertures of the plate to mechanically connect the first gasket part to the plate.

4. A plate as claimed in claim 3, in which the first part of the gasket is provided with blind holes to receive the protuberances on the gasket on an adjacent plate.

5. A plate as claimed in claim 1, in which the gasket extends beyond the adjacent edge of the plate to which it is secured and is provided with formations to interfit with corresponding formations on the gaskets of adjacent plates.

6. A plate as claimed in claim 5, in which the said formations are angled away from the plane of the plate to provide a wedge effect to stabilize the plates in a pack.

7. A plate as claimed in claim 1, in which the second part of the gasket is mechanically attached to the first part by interfitting formations.

8. A plate as claimed in claim 1, in which the plate has a recess formed between a folded wall of the plate and the first part of the gasket, and said first part having a sloping edge adjacent the second part to cooperate with the folded wall to wedge the second part of the gasket onto the plate.

9. A plate as claimed in claim 1, in which a gasket recess is formed by an inner wall provided on the plate and by an opposed wall of the first part of the gasket arrangement, the outer edge of the plate being not folded to form an outer wall.

10. A plate as claimed in claim 1, in which the plate is folded up to less than the full height of the second part of the gasket.

11. A plate for a plate heat exchanger, the said plate comprising a flow space zone and a two part gasket to seal a flow space zone, a first part of the gasket being of comparatively hard elastomeric material and substantially permanently attached to the plate, and a second part of the gasket being of comparatively soft elastomeric material so as to be compressible to form a seal, the said second part being located on a side of the said first part nearer the flow space zone to be sealed, whereby the first part provides external lateral reinforcement of the second part against the pressure in the flow space zone, and the second part being secured to the plate by means of the first part and not being directly attached to the plate, and in which the gasket extends beyond the adjacent edge of the plate to which it is secured and is provided with formations to interfit with corresponding formations on the gaskets of adjacent plates, said formations undulating longitudinally of the gaskets to interlock the plates.

12. A plate heat exchanger comprising a pack of plates, each plate comprising a flow space zone and a two part gasket to seal a flow space zone, a first part of the gasket being of comparatively hard elastomeric material and substantially permanently attached to the plate, and a second part of the gasket being of comparatively soft elastomeric material so as to be compressible to form a seal, the said second part being located on a side of the said first part nearer the flow space zone to be sealed, said first and second parts having co-operating structures in operative contact such that said second part is mechanically retained by said first part, whereby the first part provides external lateral reinforcement of the second part against the pressure in the flow space zone, and the second part being secured to the plate by means of the first part and not being directly attached to the plate, and said second part is mechanically retained by said first part in a manner allowing convenient removal of said second part for replacement.

13. A plate heat exchanger as claimed in claim 12, wherein the gasket of each plate extends beyond the adjacent edge of the plate to which it is secured and is provided with formations to interfit with corresponding formations on the gaskets of adjacent plates in which the formations of the gaskets on alternate plates are wedge form converging away from the edge of the plate and are fitted closely between the formations of the gaskets as the intervening plates, which have wedge form diverging away from the edge of the plate.

* * * * *